(12) United States Patent
Asano

(10) Patent No.: US 6,414,959 B1
(45) Date of Patent: Jul. 2, 2002

(54) ATM NETWORK SYSTEM

(75) Inventor: Katsuhito Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/152,176

(22) Filed: Sep. 11, 1998

(30) Foreign Application Priority Data

Mar. 20, 1998 (JP) .......................................... 10-071783

(51) Int. Cl.⁷ .............................................. H04L 12/28
(52) U.S. Cl. .................................. 370/395.62; 370/397
(58) Field of Search ................................ 370/227, 228, 370/397, 395, 395.62, 248, 351

(56) References Cited

U.S. PATENT DOCUMENTS

| | | | | |
|---|---|---|---|---|
| 5,583,865 A | * | 12/1996 | Esaki et al. ................... | 370/397 |
| 5,959,972 A | * | 9/1999 | Hamami ...................... | 370/228 |
| 6,075,767 A | * | 6/2000 | Sakamoto et al. ........... | 370/228 |
| 6,163,525 A | * | 12/2000 | Bentall et al. ............... | 370/227 |

FOREIGN PATENT DOCUMENTS

| | | | | |
|---|---|---|---|---|
| JP | 357123748 | * | 8/1982 | ............. H04L/7/00 |
| JP | 1-316043 | | 12/1989 | |
| JP | 3-250829 | | 11/1991 | |
| JP | 08213996 | * | 8/1996 | ............. H04L/7/00 |

* cited by examiner

Primary Examiner—Salvatore Cangialosi
(74) Attorney, Agent, or Firm—Katten Muchin Zavis Rosenman

(57) ABSTRACT

An ATM network system of the present invention contains a clock synchronization source and a plurality of nodes. In this ATM network system, a plurality of clock supply routes are set, which are used in receiving clocks from the clock synchronization source by each of the nodes. When each of the nodes detects a failure occurred in the presently used route, each of the nodes supplies a failure signal to other nodes which receive the clock supplied from the own node through this route, and further changes a route under use into another route. When each of the nodes receive the failure signals from other nodes, each of these nodes changes the route under use into another route.

9 Claims, 13 Drawing Sheets

FIG.2

| PRIORITY ORDER | NODE12 | NODE13 | NODE14 | NODE15 | NODE16 | NODE17 |
|---|---|---|---|---|---|---|
| 1 | A | C | A | C | D | F |
| 2 | E | D | E | E | A | B |
| 3 | F | B | B |   | B |   |
| 4 |   | E |   |   | E |   |

→ FIRST PRIORITY ORDER
┈┈→ SECOND PRIORITY ORDER

ATM NETWORK SYSTEM

BACKGROUND OF THE INVENTION

1. Field of the Invention

The present invention relates to an ATM (Asynchronous Transfer Mode) network system capable of determining a clock synchronization topology (clock supply route) required to transfer audio data and video data through an ATM network.

2. Description of the Related Art

Currently, ATM networks have been developed and are available in the market as transfer media of multimedia applications. The various utilization needs are made of ATM networks. For example, not only LAN data are transferred via ATM networks, typically known as the Internet, but also the ATM network are used in application software of synchronization systems for audio data and video (picture) data. In this case, in order that application software of synchronization systems are transmitted/received in proper manner between these terminals, clock synchronization must be established between terminals so as to transmit/receive data. As a result, in the case that an ATM network is employed in order to repeat data in a synchronization system, this ATM network is required to establish a clock synchronization. As a consequence, clock synchronization topology within the ATM network should be established, which can be hardly influenced by external factors such as a failure, or a defect.

Conventionally, when an ATM network designer tries to design an ATM network, this designer sets a clock synchronization network of ATM switching units (i.e., nodes, will be referred to as "switching units" hereinafter) within this ATM network, and switching units clock synchronization sources every switching unit. Concretely speaking, the ATM network designer presets such a switching unit that constitutes the clock synchronization source, and also determines a clock extracting port (namely, port used to receive clocks from other switching units) of the other respective switching units in such a manner that the clock synchronization topology may own exclusive intention. At this time, the ATM network designer also presets clock extracting ports subsequent to a second priority order, assuming that a failure may occur in the clock supply routes of the respective switching units. In the case that the clock cannot be extracted from the presently used clock extracting port, the clock may be extracted from another clock extracting port having a priority order subsequent to that of this clock extracting port under use.

However, the conventional ATM networks own the following problems. That is, as previously explained, the switching process operations of the clock extracting ports are carried out in the respective switching units. At this time, in such a case that a switching unit for executing the switching process operation is located in an upper stream of other switching units, the adverse influence is given to other switching units existing in a down stream.

FIG. 13 is an explanatory diagram for indicating the problem as to the clock synchronization network in the conventional ATM network. In FIG. 13, this ATM network has the switching units (nodes) 1 to 6. In this ATM network, the clock supply route (clock synchronization topology) having the first priority order, which is directed from the switching unit 1 to the switching unit 4, is set, whereas the clock supply route having the first priority order, which is directed from the switching unit 1 to the switching unit 5, is set. Also, the clock supply route having the second priority order, which is directed from the switching unit 4 to the switching unit 6, is set; whereas the clock supply route having the second priority order, which is directed from the switching unit 5 to the switching unit 2, is set.

While the clock supply route having the first priority order is used in this ATM network, when a failure happens to occur in the clock supply path connected between the switching unit 2 and the switching unit 3, the switching unit 3 cannot receive the clock supplied from the switching unit 2. As a result, the switching unit 3 switches the clock extracting port in accordance with the conditions set to the own switching unit 3, so that the clock supply route is switched to the clock supply route having the second priority order, through which the clock is received from the switching unit 4.

However, the switching unit 3 has no structure capable of transferring to the switching unit 4 and the switching unit 5 such a fact that the failure occurs in the clock supply path. As a consequence, even after the switching unit 3 is brought into such a condition that the clock is received from the switching unit 4, this switching unit 4 maintains such a condition for receiving the clock from the switching unit 3. On the other hand, since the switching unit 5 maintains the setting conditions before the failure happens to occur, the clock received from the switching unit 6 is not supplied to the switching unit 4. As a result, the clock loop is produced between the switching unit 3 and the switching unit 4, and thus both the switching units 3 and 4 are disconnected from the clock synchronization network, so that these switching units 3 and 4 cannot be synchronized with other switching units 1, 2, 5, and 6.

In the ATM network shown in FIG. 13, when a failure happens to occur in the switching unit 1, there are certain possibilities that the clocks are not supplied to other switching units 2 to 6.

SUMMARY OF THE INVENTION

An object of the present invention is to provide an ATM network system capable of avoiding such a problem that when a failure happens to occur in a clock supply route, a switching unit disconnected from a clock synchronization network will occur.

A first aspect of the present invention is featured by such an ATM network system having a clock synchronization source and a plurality of nodes synchronized with the clock synchronization source, and set a plurality of routes for supplying a clock from said synchronization source to each of said nodes. In this ATM network system, each of the nodes, when detecting a failure occurred in a presently used route, gives a failure signal to an other node to be supplied a clock from the node through a failure-detected route, and changes the failure-detected route into an other route. Each of said nodes, when received a failure signal from an other node, changes the failure-detected route into an other route in accordance with the failure signal.

In accordance with the first aspect, when the node which has detected the failure of the clock supply route changes the route used by the node, this node supplies the failure signal to another node located in the down stream of the node in such a node where the failure occurs. Then, another node changes the route used by the node based upon the failure signal. As a result, even when the node which has detected the failure is brought into such a condition that since the route is changed by this node and no clock is supplied to another node, another node can receive the clock by changing the node. As a consequence, it can be prevent another node from being deviated from the clock synchronization network.

In this case, as the node, for instance, ATM transfer units such as an ATM switching unit, ATM-HUB, and an ATM router may be employed, which constitute an ATM network. Also, as the clock synchronization source, a node having a clock generating source, or a node for receiving a clock from a user terminal unit may be employed.

A second aspect of the present invention is featured by such a clock supply route determining method in an ATM network system in which said ATM network is constructed based on the private network-to-network interface specification (PNNI). In the ATM network system, a plurality of nodes for constituting the ATM network forms a pier group. Each of nodes within the pier group owns data of shortest routes defined from the own node to each of other nodes. Any of the nodes within the pier group is set as a pier group leader, and this pier group leader is set as a clock synchronization source. Then, the pier group leader determines shortest routes defined from the pier group leader to other nodes based upon the data of the shortest routes as a clock supply route, and the respective nodes other than the pier group leader determine as clock supply routes, shortest routes defined from the nodes to the pier group leader based on the data of the shortest route.

In accordance with the second aspect, in the ATM network system made based upon PNNI, the respective nodes belonging to the pier group acquire the topology data of the pier group, and then calculate the shortest routes based on this topology data. Since the clock supply routes are determined by the data of the shortest routes, the clock supply routes in the ATM network may be automatically determined.

BRIEF DESCRIPTION OF THE DRAWINGS

For a more better understanding of the present invention, reference is made of a detailed description to be read in conjunction with a detailed description to be read in conjunction with the accompanying drawings, in which:

FIG. 2 is a table for indicating priority orders of clock supply routes of the respective switching units shown in FIG. 1;

DETAILED DESCRIPTION OF THE PREFERRED EMBODIMENTS

Referring now to drawings, various preferred embodiments according to the present invention will be described.
[EMBODIMENT 1]

Figure 1:
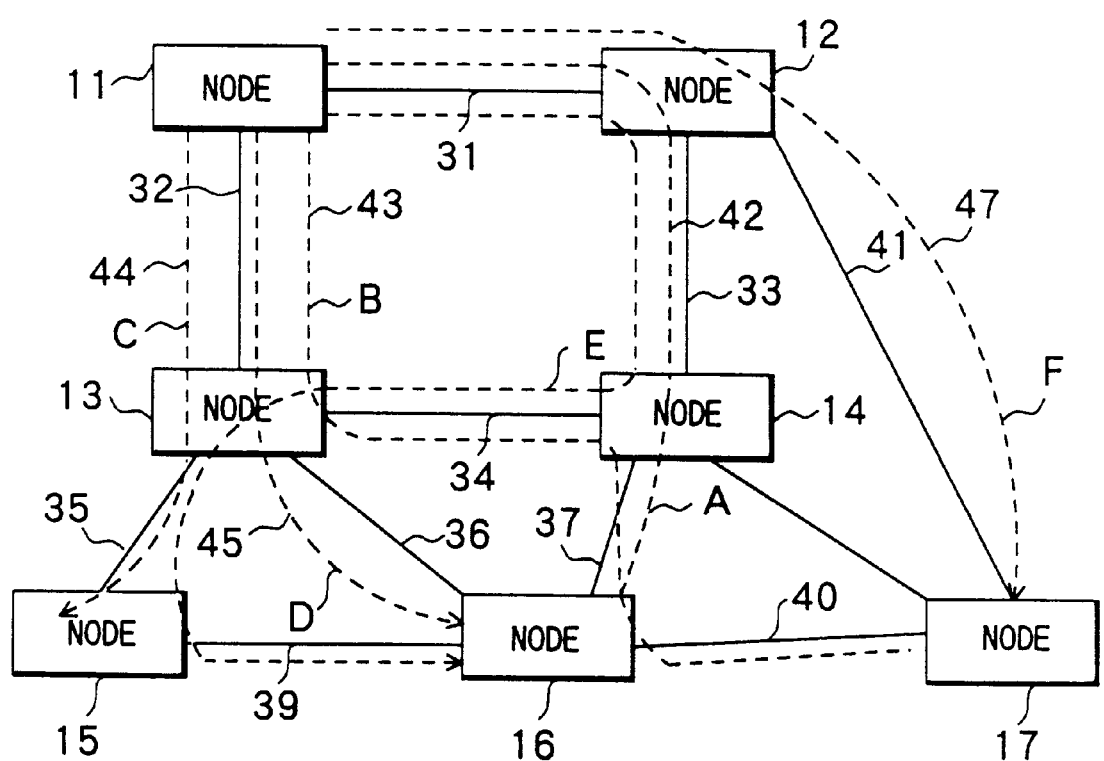
FIG. 1 is a diagram showing an ATM network according to a embodiment 1 of the present invention.

FIG. 1 is a diagram showing an ATM network according to a embodiment 1 of the present invention. In FIG. 1, the ATM network is equipped with 7 sets of ATM switching units (nodes) 11 to 17. Each of the switching units 11 to 17 is connected through a communication line to more than one set of user terminal unit (not shown in detail) containing a LAN (Local Area Network). The ATM network may function as a repeating network of audio/video data communicated among terminals. Each of the switching units 11 to 17 may function as a node (switching point) of a cell for storing thereinto audio/video data. Also, the respective switching units 11 to 17 transfer data at CBR (Constant Bit Rate).

Also, the respective switching units 11 to 17 are connected through paths 31 to 41 for supplying clocks with other switching units adjacent to the own switching unit. Then, 6 sets of clock supply routes (clock synchronization topology) "A" to "F" are set to the ATM network, while the switching unit 11 is used as a clock synchronization source. Also, connections 42 to 47 for identifying clock synchronization are set to this ATM network in correspondence with the respective clock supply routes "A" to "F".

In other words, the connection 42 passing through the clock supply route "A" defined from the switching unit 11 through the switching unit 12 and the switching unit 14 to the switching unit 16 is set, and the connection 43 passing through the clock supply route "B" defined from the switching unit 11 through the switching unit 13, the switching unit 14 and the switching unit 16 to the switching unit 17 is set. Also, the connection 44 passing through the clock supply route "C" defined from the switching unit 11 through the switching unit 13 to the switching unit 15 is set, and the connection 45 passing through the clock supply route "D" defined from the switching unit 11 through the switching unit 13 to the switching unit 15 is set. Also, the connection 46 passing through the clock supply route "E" defined from the switching unit 11 through the switching unit 12, the switching unit 14, the switching unit 13, and the switching unit 15 to the switching unit 16 is set, and the connection 47 passing through the clock supply route "F" defined from the switching unit 11 through the switching unit 12 to the switching unit 17 is set.

FIG. 2 is a memory table for representing priority orders of the clock supply routes "A" to "F" set to the respective switching unit 12 to 17. In the case that a failure, or a defect happens to occur in the clock supply route presently used by the own switching unit, the respective switching units 12 to 17 change the clock supply routes "A" to "F" in accordance with the content of this table shown in FIG. 2.

Figure 3:
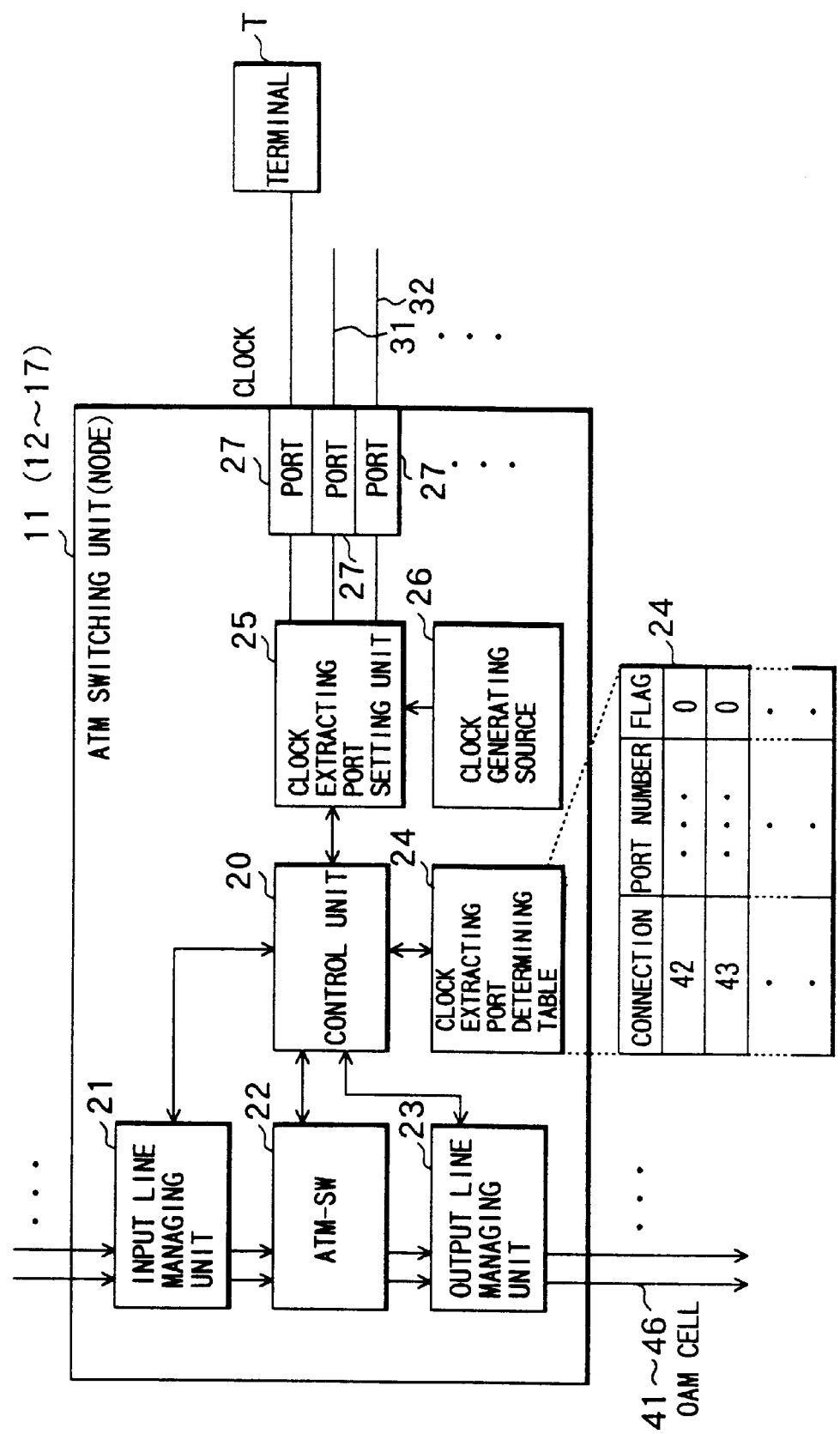
FIG. 3 is a diagram showing the switching unit shown in FIG. 1.

FIG. 3 is a diagram showing a example of the respective switching units 11 to 17. It should be noted that since each of these switching units 11 to 17 owns the same structure, the switching unit 11 is represented as an example in FIG. 3. In FIG. 3, the switching unit 11 includes a control unit 20, an input line managing unit 21 connected to the control unit 20, an ATM-SW 22, and an output line managing unit 23.

A cell for storing audio/video data thereinto is inputted to the input line managing unit 21. In response to an instruction issued from the control unit 20, the input line managing unit 21 terminates a connection; monitors a flow rate of a cell; converts a header of a cell; monitors performance; and assembles/disassembles a cell. Also, when an OAM cell (Operation And Maintenance Cell) is inputted into the input line managing unit 21, a storage content of this OAM cell is supplied to the control unit 20 by the input line managing unit 21.

The ATM-SW 22 routes a cell entered from the input line managing unit 21. The output line managing unit 23 sends out the cell received from the ATM-SW 22 to a predetermined connection. Also, the output line managing unit 23 monitors the performance in response to an instruction issued from the control unit 20 to produce an OAM cell, if required, and then supplies this produced OAM cell to the connections 41 to 46.

Also, the switching unit 11 contains a memory table 24 for determining a clock extracting port, which is connected to the control unit 20. The table 24 is hold in a storage unit such as a semiconductor memory, a magnetic disk, and a magnetic optical disk. The tale 24 stores thereinto connections for detecting OAM cells, and numbers of input ports and output ports after port change process operations have been performed in connection to these connections. This table 24 also stores flags as to failure conditions of the respective connections 42 to 47.

Furthermore, the switching unit 11 contains a clock extracting port setting unit (will be referred to as a "port setting unit" hereinafter) 25 connected to the control unit 20, and also a clock generating source 26 connected to the port setting unit 25. This port setting unit 25 is connected to a plurality of clock extracting ports (simply referred to as "ports" hereinafter) 27. The respective ports 27 are connected to paths 31 and 32. In response to an instruction issued from the control unit 20, the port setting unit 25 sets any one of "input port for clock (clock extracting port)", "output port for clock", and "unused" with respect to each of the ports 27.

Also, the port setting unit 25 supplies a clock outputted from either the clock generating source 26 or the terminal (user terminal unit) T to respective structural unit of the switching unit, to output the clock from the output port. It should also be noted that since the switching units 12 to 17 are set to receive clocks from other switching units, the port setting unit 25 of the respective switching units 12 to 17 receives the clock entered from the input port and then supplies the received clock to the respective structural units employed in the switching units, and further outputs the clock from the output port toward other switching units.

The control unit 20 is mainly arranged by a CPU (central processing unit) and a memory, and controls the respective structural unit of the switching unit by executing a control program stored in this memory. For example, the control unit 20 monitors a failure occurred in a path connected to such a switching unit existing in an upper stream, and executes a clock extracting port changing process operation (will be discussed later), if necessary, in accordance with an OAM protocol.

Next, a description will now be made of an operating example of the respective switching units 11 to 17 in the ATM network shown in FIG. 1. In this case, as an example, operation is described in such a case that the clock generated from the switching unit 11 is received by each of the switching units 12 to 17 through the clock supply routes (namely, routes A, C, D, and F) having the priority order "1".

The switching unit 11 outputs the clock which has received from either the clock generating source 26 or the terminal "T" from the respective ports 27 to the paths 31 and 32. As a result, the respective switching units 12 to 17 receive the clocks through the routes A, C, D and F, and then establish synchronization with each other so as to be operated.

Figure 4:
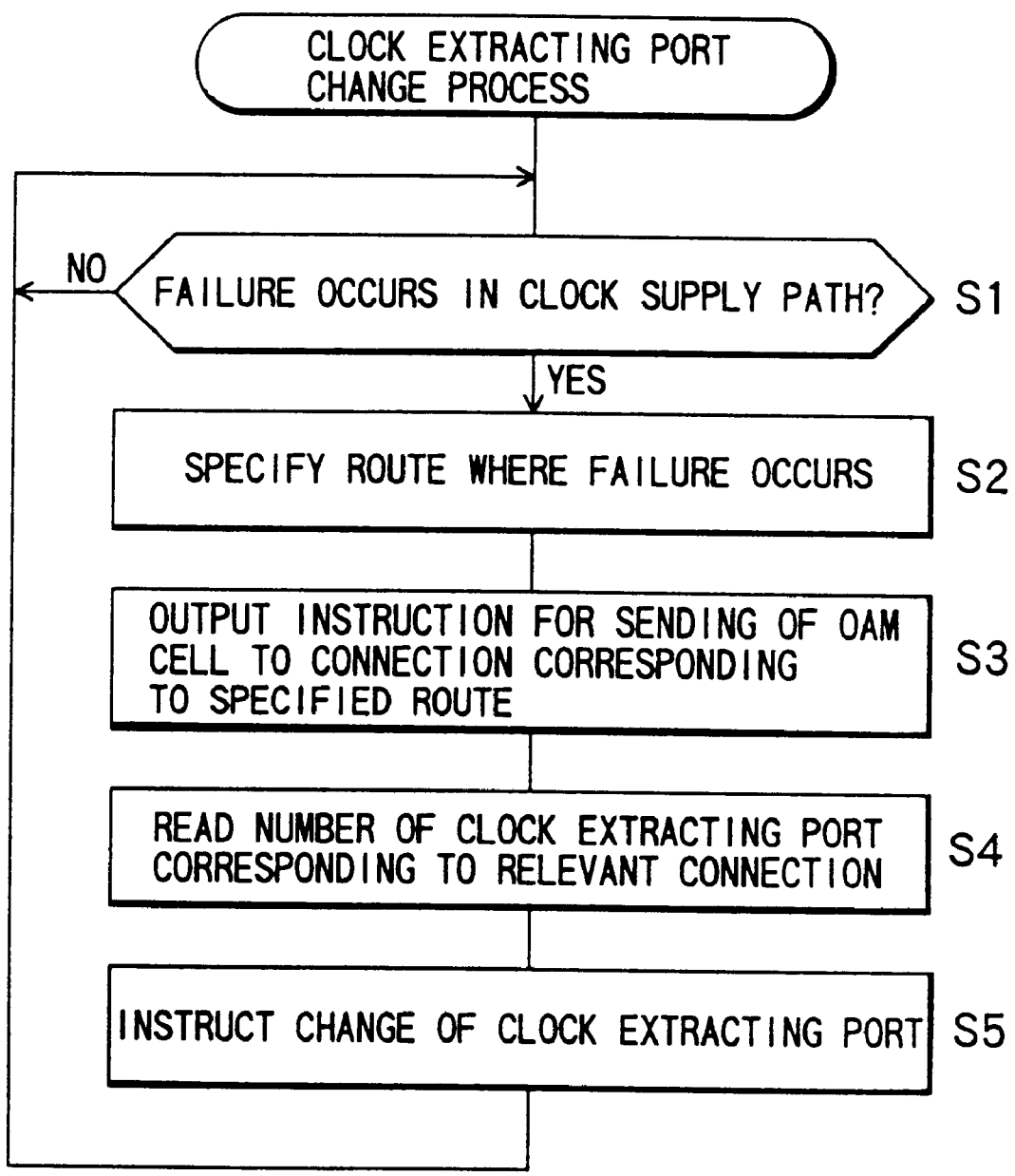
FIG. 4 is a flow chart for describing a clock extracting port change process operation of the ATM network according to the embodiment 1.

Thereafter, it is assumed that a failure, or a defect happens to occur in the path 32 used to connect the switching unit 11 with the switching unit 13. In this case, since no clock is entered into the switching unit 13, the input line managing unit 21 of the switching unit 13 detects the failure occurred in the path 32. As a result, the control unit 20 of the switching unit 13 executes a clock extracting port changing process operation indicated in FIG. 4.

That is, when the failure occurred in the path 32 is detected (S1; YES), the control unit 20 of the switching unit 13 specifies the routes where the failure happens to occur (in this case, routes B, C, and D)(S2). The control unit 20 of the switching unit 13 issues such an instruction that an OAM cell containing an AIS (Alarm Indication Signal) is sent out to the respective connections corresponding to the specified routes, and sets flags of the corresponding connections in the table 24 to "1" (S3). As a consequence, the output line managing unit 23 produces an OAM cell containing an AIS signal, and sends out the OAM cell to the respective connections 43, 44, and 45 corresponding to the routes B, C, and D.

Subsequently, the control unit 20 reads from the table 24, the number of the clock extracting port corresponding to the relevant connection (S4). At this time, the control unit 20 reads the number corresponding to the connection of the route where no failure happens to occur, namely the flag being "0" in accordance with the priority order shown in FIG. 2. In this case, the number of the port 27 for storing the path 35 is read. Thereafter, the control unit 20 supplies a clock extracting port change instruction to the port setting unit 25 (S5). As a result, the port setting unit 25 changes the clock extracting port from the port 27 for storing the path 32 into the port 27 for storing the path 35.

Figure 5:
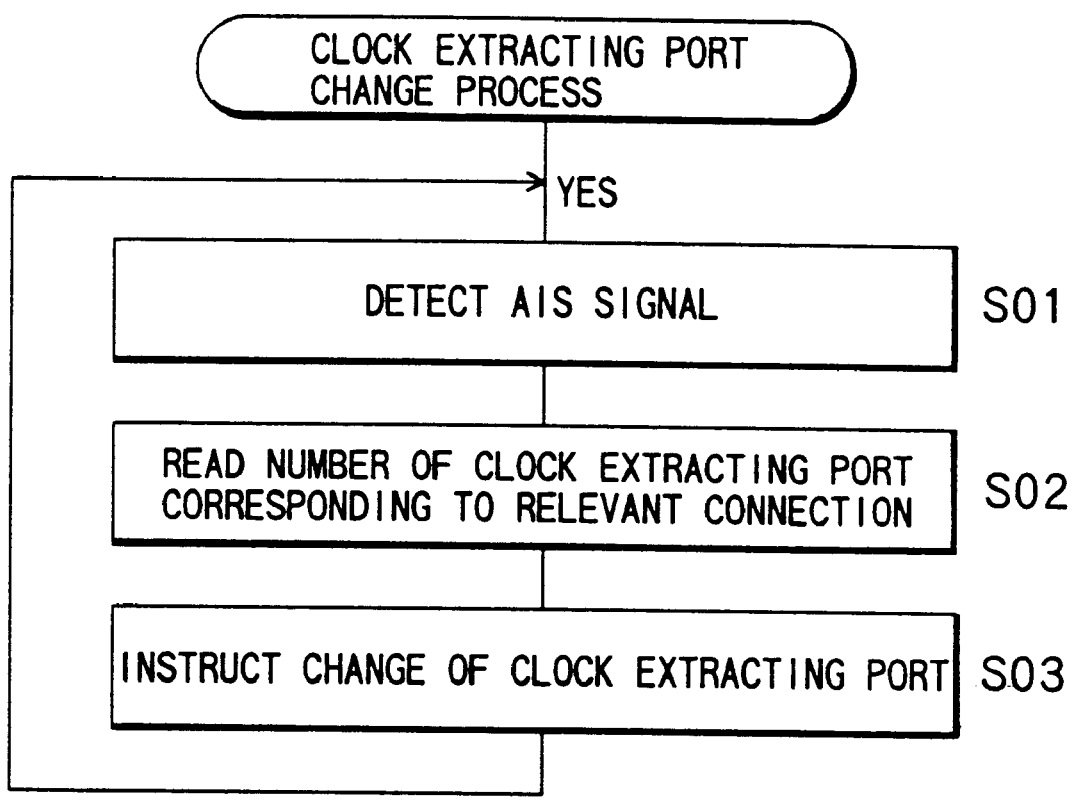
FIG. 5 is a flow chart for describing a clock extracting port change process operation of the ATM network according to the embodiment 1.

Thereafter, the OAM cell sent out from the switching unit 13 is supplied through the respective connections 43 to 45 to the respective switching units 14 to 17. Thus, the control unit 20 of each of the switching units 14 to 16 executes the clock extracting port change process operation shown in FIG. 5. In other words, when the control unit 20 detects the AIS signal from the OAM cell entered into the input line managing unit 21 (S01), the control unit 20 sets the flag of the table 24 to "1" as to the connection to which the OAM cell has been transferred, and thereafter reads out, from the table 24, the port number corresponding to the connection to which this OAM cell has been transferred in a manner similar to that of the previous step S4 (S02).

Subsequently, the control unit 20 supplies the read port number as a clock extracting port change instruction to the port setting unit 25 (S03), and accomplishes the clock extracting port changing process operation. Thereafter, the port setting unit 25 changes the setting conditions of the respective ports 27 in accordance with the port number received from the control unit 20.

As a result, the switching unit 14 sets the ports 27 for storing the respective paths 34 and 37 as the output ports, the switching unit 15 sets the port 27 for storing the path 39 as the output ports, and the switching unit 16 changes the input port from the port 27 for storing the path 36 to the port 27 for storing the path 37. As a consequence, the following conditions are set. That is, the respective switching units 12 to 16 receive the clocks through the clock supply route E, and the switching unit 17 receives the clock through the clock supply route F.

Next, the respective switching units 15 to 17 produce another OAM cell containing RDI (Remote Defect Indication) corresponding to AIS (Alarm Indication Signal), and transmit this OAM cell to the switching unit 11.

In accordance with the embodiment 1, in the case that the connections 42 to 27 for identifying the clock synchronization are set to the ATM network and then, the failure happens to occur in the path for supplying the clock, the AIS signal is given to such a switching unit located in the down stream of the failure-occurred path, and then, the relevant switching units change the clock supply routes. As a consequence, the present invention can prevent the switching unit from being disconnected from the clock synchronization network, which is caused when the clock loop occurs as in the conventional ATM network.

[EMBODIMENT 2]

Figure 6:
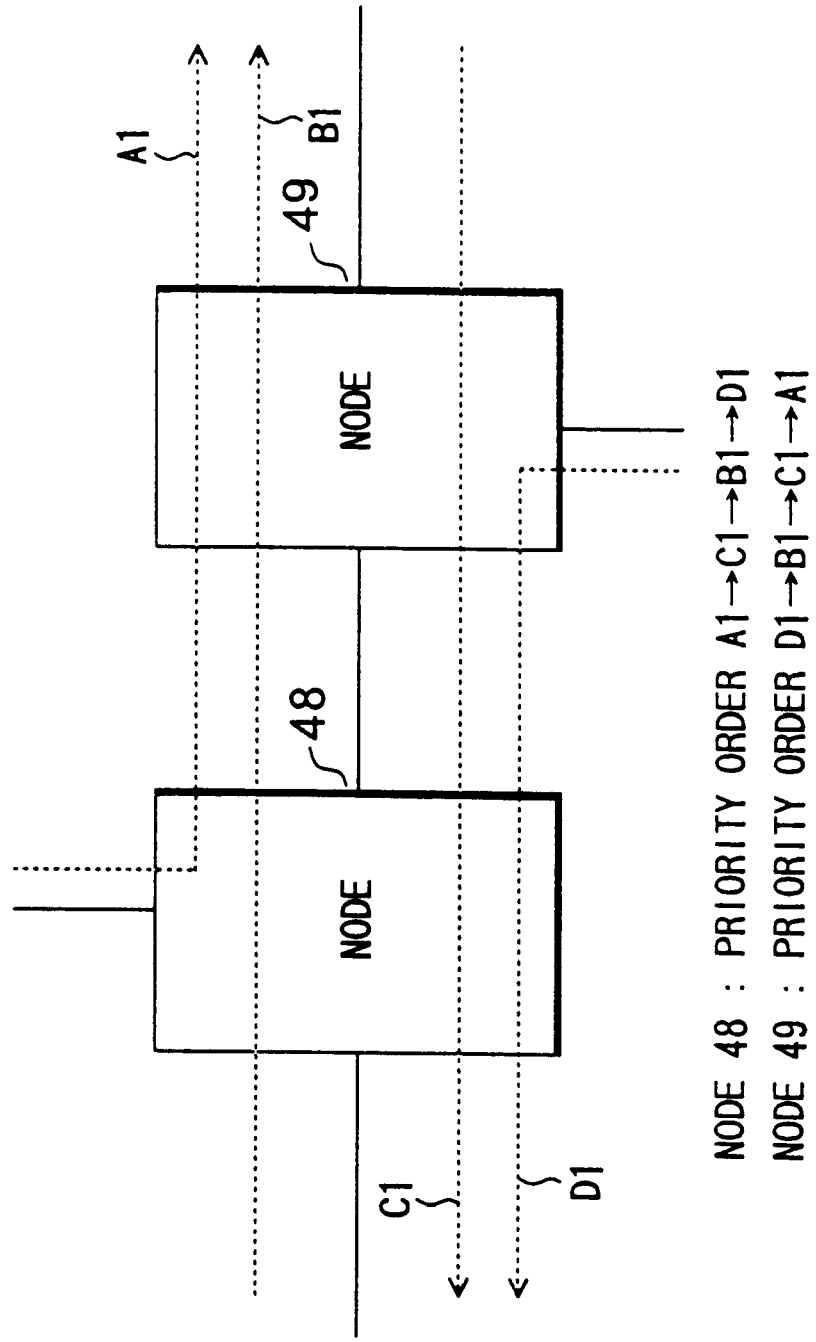
FIG. 6 is a diagram showing a portion of an ATM network according to a embodiment 2 of the present invention.

FIG. 6 is a diagram showing a portion of an ATM network according to an embodiment 2 of the present invention. As shown in FIG. 6, a switching unit 48 and another switching unit 49, which constitute a portion of the ATM network, are connected through a path for supplying a clock. Two clock supply routes where the switching unit 48 is set in an upper stream are set to the respective switching units 48 and 49, and connections A1 and B1 for identifying clock synchronizations of these routes are set thereto. On the other hand, two clock supply routes where the switching unit 49 is set in an upper stream are set to the respective switching units 48 and 49, and connections C1 and D1 for identifying clock synchronization of these routes are set thereto.

Now, it is assumed that the switching unit 48 receives an AIS signal from the connection A1 in such a case that the switching unit 48 receives a clock from another switching unit (not shown) through the route along the connection A1, and the switching unit 49 receives a clock from another switching unit (not shown) through the route along the connection D1. At this time, it is also assumed that the switching unit 48 is brought into such a condition that the clock is received through the route along the connection C1 in accordance with a priority order given to the own switching unit 48. In other words, the switching unit 48 changes the clock extracting port in such a manner that the switching unit 48 extracts the clock from the switching unit 49.

Thereafter, when the switching unit 49 receives an AIS signal from the connection D1 and is brought into such a condition that this switching unit 49 receives the clock through the route along the connection B1 in accordance with the priority order given thereto, namely when the switching unit 49 changes the clock extracting port in such a way that the clock derived from the switching unit 48 is extracted, a clock loop is produced between the switching unit 48 and the switching unit 49. As a result, both the switching unit 48 and the switching unit 49 are deviated from the clock synchronization network.

Figure 7:
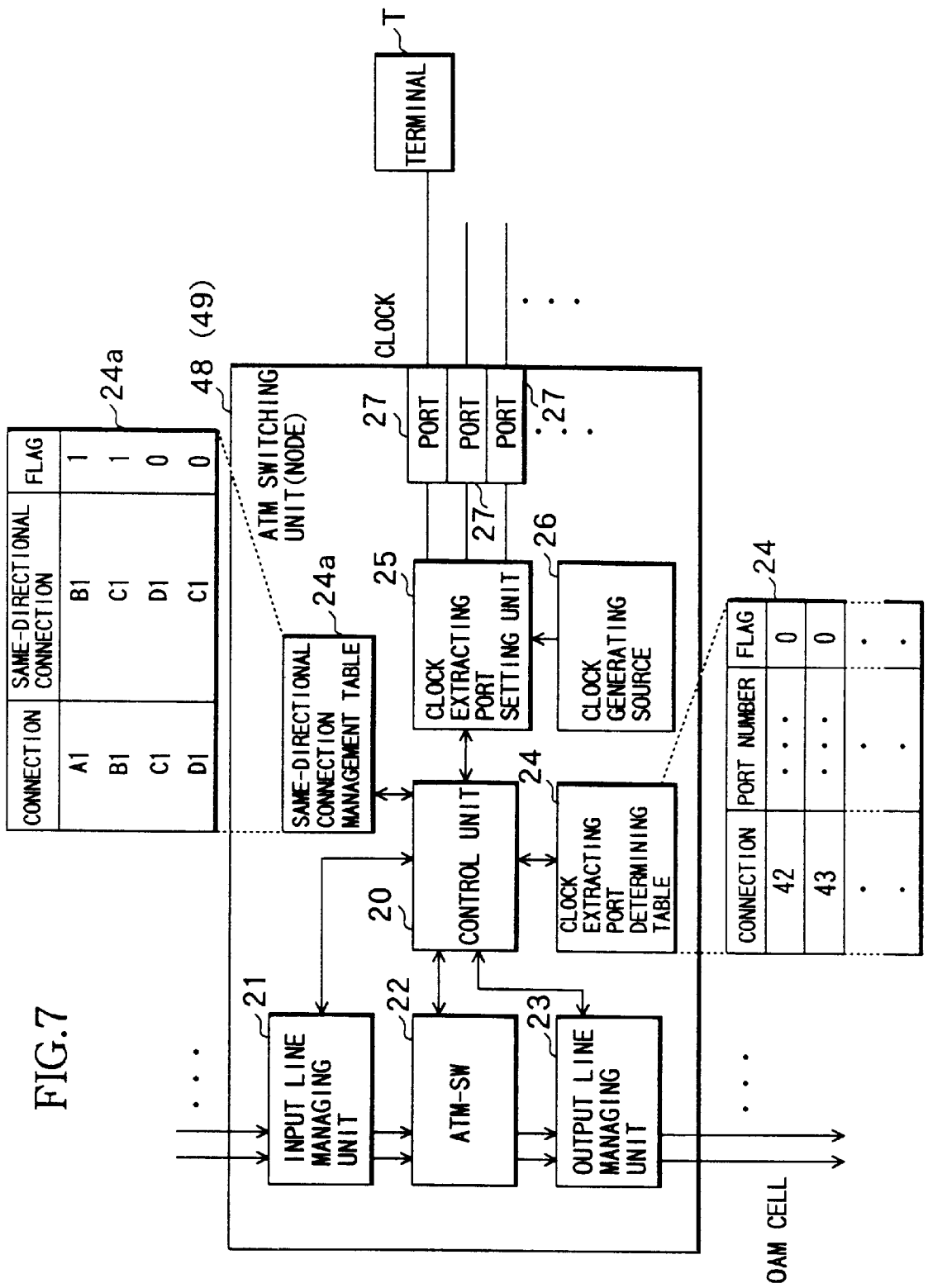
FIG. 7 is a diagram showing the switching unit shown in FIG. 6.

To avoid the above-described clock loop, as indicated in FIG. 7, a table 24a for managing same directional connections is provided in each of the switching units 48 and 49 in addition to the arrangement as explained in the embodiment 1. The table 24a contains the number of connections as addresses and the number of same-directional connections as data, and further holds a flag as to whether or not a failure happens to occur in a connection (clock supply path).

Now, a description will be made of operations of the respective switching units 48 and 49. Now, it is assumed that the switching unit 48 receives an OAM cell containing an AIS signal from the connection A1 in such a case that the switching unit 48 receives a clock from another switching unit (not shown) through the route along the connection A1, and the switching unit 49 receives a clock from another switching unit (not shown) through the route along the connection D1.

Figure 8:
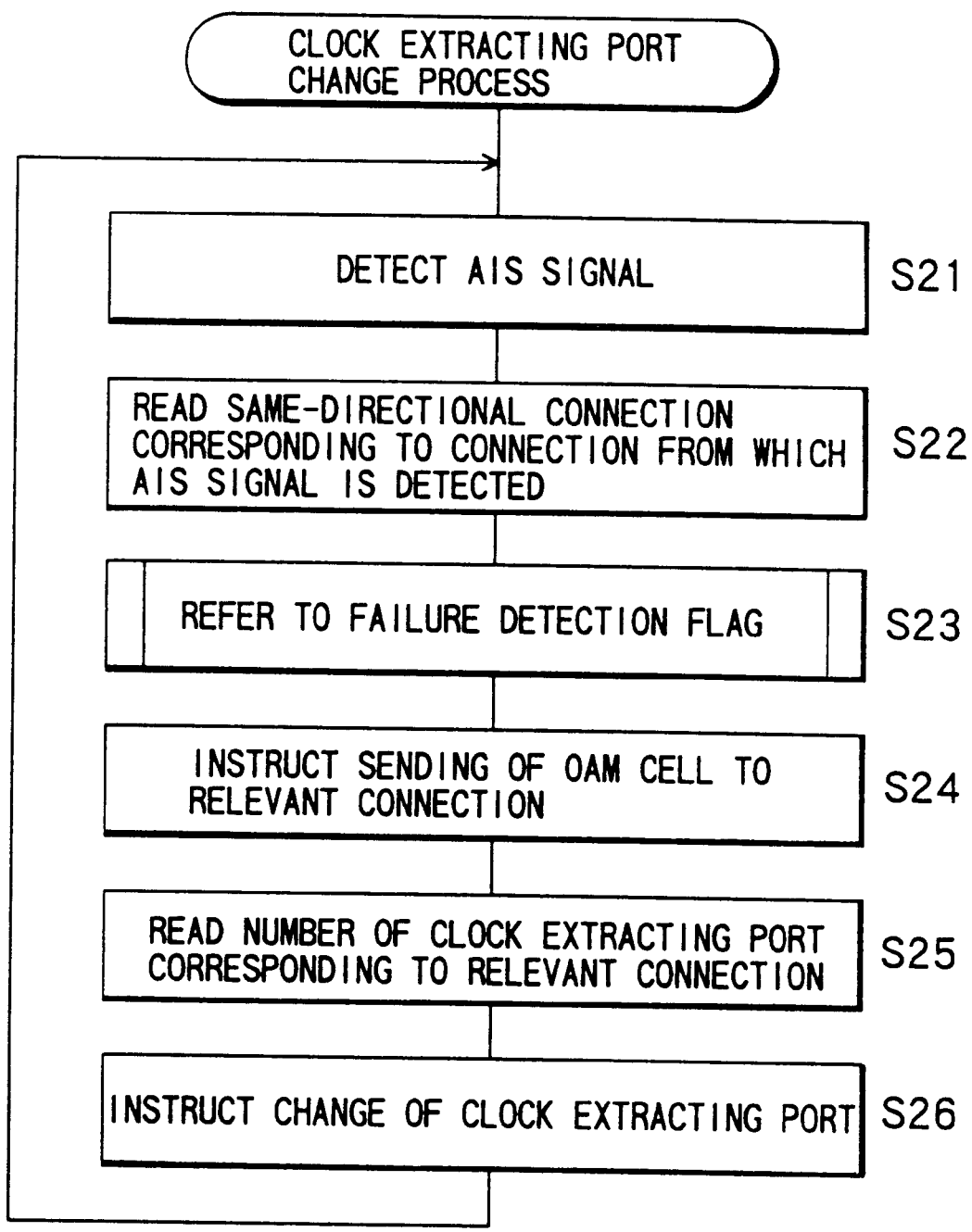
FIG. 8 is a flow chart for describing a clock extracting port change process operation of the ATM network according to the embodiment 2.
Figure 9:
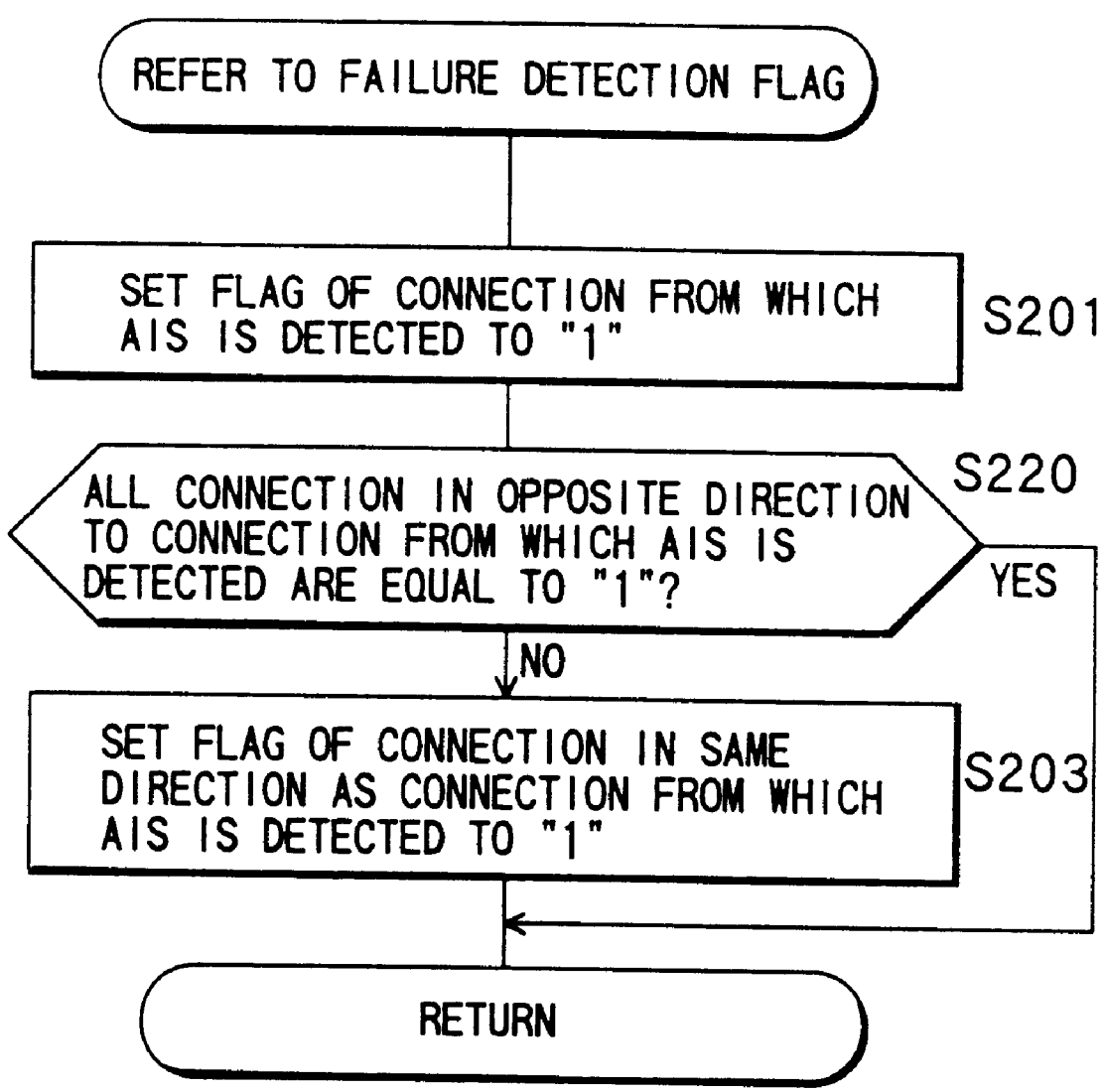
FIG. 9 is a flow chart for describing a clock extracting port change process operation of the ATM network according to the embodiment 2.

As a consequence, the control unit 20 of the switching unit 48 executes clock extracting port changing process operations indicated in FIG. 8 and FIG. 9. In other words, when the control unit 20 detects the AIS signal from the OAM cell entered into the input line managing unit 21 (S21), the control unit 20 reads the same-directional connection corresponding to such a connection (in this case, connection A1) for transferring the OAM cell from the table 24a based upon this AIS signal (S22). In this case, as the same-directional connection of the connection A1, the number of the connection B1 is read out.

Subsequently, the control unit 20 refers to the flag in the table 24a (S23). At this time, as represented in a subroutine in FIG. 9, the control unit 20 sets the flag of the connection (connection A1) from which the AIS signal is detected to "1" (S201). Also, the control unit 20 judges as to whether or not all of the flags of the connections (in this case, connections C1 and D1) along the direction opposite to that of the above connection from which the AIS signal is detected are set to "1" (S202).

At this stage, when all of the flags are not equal to "1" (step 202; NO), the control unit 20 sets the flag of the connection (namely, connection B1) in the same direction to that of the connection from which the AIS signal is detected to "1" (S203), and the process operation is returned to the main routine shown in FIG. 8. To the contrary, when all of the flags are equal to "1" (S202; YES), the process operation is returned to the main routine of FIG. 8.

In this operation, when the control unit 20 executes the judgment defined at the step 202, it is assumed that no failure occurs in the route of the clock supply paths in accordance with the connections C1 and D1. In this case, since the flags of the connections C1 and D1 are equal to "1", the control unit 20 sets the flag of the connection B1 to "1".

Subsequently, based upon the reference result of the table 24a, the control unit 20 issues to the output line managing unit 23, such an instruction that the OAM cell containing the AIS signal is sent to the connection whose flag is set to "1" (S24). As a result, the output line managing unit 23 sends out the OAM cell to the relevant connection. In this case, such a conditions are made that the OAM cell is transmitted to the connections A1 and B1, and the quasi-failure happens to occur in the route of the clock supply path along the connection B1.

Thereafter, the control unit 20 reads a port number corresponding to the connection A1 from the table 24 (S25). Subsequently, the control unit 20 supplies the read port number as the clock extracting port change instruction to the port setting unit 25 (S26). As a result, the port setting unit 25 changes the clock extracting port in order to receive the clock through the route defined by the connection C1 in accordance with the port number received from the control unit 20. As a consequence, the switching unit 48 is brought into such a condition that this switching unit 48 receives the clock from the switching unit 49.

Next, when the OAM cell containing the AIS signal is received from the connection D1 in the switching unit 49, the flags of the respective connections A1 and B1 in the table 24a are set to "1", and the setting condition of the respective ports 27 are changed in such a manner that the clock is given to the switching unit 48 through the route along the connection C1.

Thereafter, when the switching unit 49 receives the OAM cell containing the AIS signal from the connection D1, the control unit 20 of the switching unit 49 executes the clock extracting port change process operations shown in FIG. 8 and FIG. 9. It should be understood that the control unit 20 of the switching unit 49 does not set the flag of the connection C1 to "1" in a process operation defined at step S202 shown in FIG. 9, taking account of such a fact that the flags of the respective connections A1 and B1 in the table 24a are set to) "1". As a result, in the switching unit 49, the operation condition thereof is transferred to such a condition that the clock is received through the route along the connection C1 without being transferred to such a condition that the clock is received from the route along the connection D1 to the route along the connection B1.

In accordance with the embodiment 2, when the switching unit 48 receives the OAM cell containing the AIS signal from the connection A1, since the OAM cell is also sent to the connection B1 which is the same-directional connection as the connection A1, the switching unit 49 recognizes that the failure also occurs in the route along the connection B1. Therefore, the switching unit 49 is brought into such a condition that the clock is detected through the route along the connection B1 in response to the failure occurred in the route along the connection D1. Thus, it is possible to prevent the clock loop from being produced between the switching unit 48 and the switching unit 49.

[EMBODIMENT 3]

Figure 10:
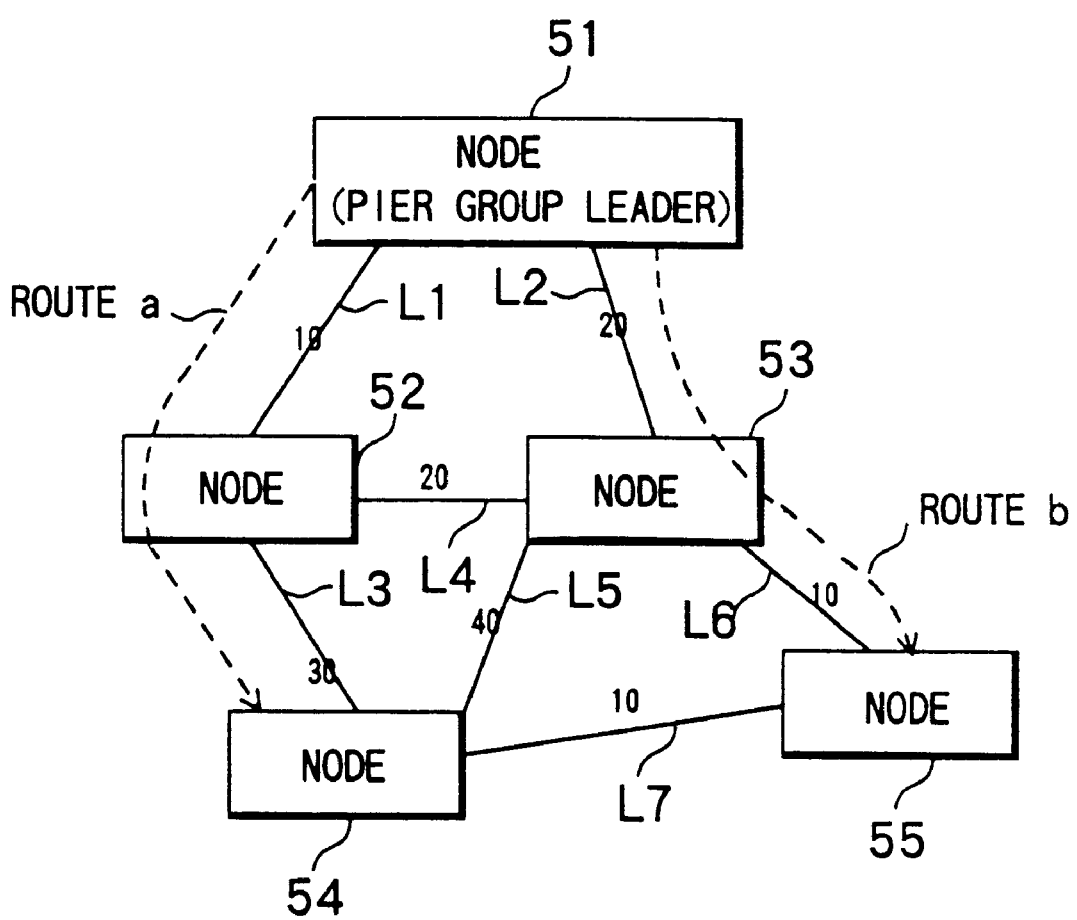
FIG. 10 is a diagram showing an ATM network according to a embodiment 3 of the present invention.

FIG. 10 is a diagram showing an ATM network according to an embodiment 3 of the present invention. This ATM network corresponds to a private ATM network which is formed by using the PNNI (Private Network-to-Network Interface) specification defined in the ATM forum. In other words, the ATM network according to the embodiment 3 is arranged based upon the recommendation by "The ATM Committee" Private Network-to-Network Specification Interface vol. 0" Mar. 1996".

In FIG. 10, the ATM network is arranged by 5 sets of switching units 51 to 55. The respective switching units 51 to 55 are connected with the switching units adjacent to each other through any one of clock supply paths L1 to L7. Each of these paths L1 to L7 owns a metric (cost) caused by using its path. Reference numerals indicated on the paths L1 to L7 of FIG. 10 represent metrics of the paths.

The switching units 51 to 55 constitute a group called as a "pier group". The "pier group" is equal to a group of nodes which contain the same topology databases, and exchange complete information related to link conditions with each other. Each of the switching units 51 to 55 constitutes a so-called "lowest level node". Within a pier group, any one of switching units belonging to a group is set as a pier group leader.

In this embodiment 3, the switching unit 51 is set as the pier group leader, and the respective switching units 52 to 55 are set as group members. Then, the switching unit 51 constituting the pier group leader functions as a clock synchronization source, and supplies a clock to other switching units 52 to 55.

The respective switching units 51 to 55 determines a clock supply route as follows: That is, the respective switching units 51 to 55 exchange a "PNNI HELLO" packet between the own switching unit and the switching unit adjacent to the own switching unit. As a result, the respective switching units 51 to 55 exchange the clock supply path for connecting the own switching unit with the switching unit adjacent to the own switching unit, namely exchange the information of the link (involving metric (cost) of the link).

Subsequently, each of switching units 51 to 55 transmits a message of "PTSE (PNNI Topology State Element)" containing all of the link information connected with the own switching unit to all of such switching units located adjacent to the own switching unit. At this time, in the case that each of the switching units 51 to 55 receives a "PTSE" message from another switching unit, each of the switching units 51 to 55 transmits this "PTSE" message to all of the adjoining switching units other than the above-described switching unit which has sent out this "PTSE" message.

While such a process operation is repeatedly carried out, the respective switching units 51 to 55 may finally acquire the link information related to all of the switching units belonging to the pier group. Then, each of these switching units 51 to 55 owns this link information as the topology database. As a consequence, the respective switching units 51 to 55 may grasp the topology of the ATM network.

Thereafter, the respective switching units 51 to 55 calculate routes (namely, the shortest routes) where the metrics on the links between the own switching units and other switching units by using the link information saved in the topology databases, and then stores thereinto the calculated shortest routes. This shortest route calculation is performed for all of other switching units. Then, the switching units 51 sets such a clock supply route in accordance with the shortest route between the own switching unit and each of other switching units 52 to 56. As a result of the shortest route calculating process operation, the switching unit 51 may have a view (clock tree) indicated in FIG. 11(A). In accordance with this view, the switching unit 51 sets as a clock supply route "a", such a route defined from the switching unit 51 through the switching unit 52 to the switching unit 54, and also sets as another clock supply route "b", such a route defined from the switching unit 51 through the switching unit 53 to the switching unit 55. On the other hand, the respective switching units 52 to 56 set the port of the shortest routes to the switching unit 51 as the clock extracting ports based upon the results of the shortest route calculating process operation.

Figure 11:
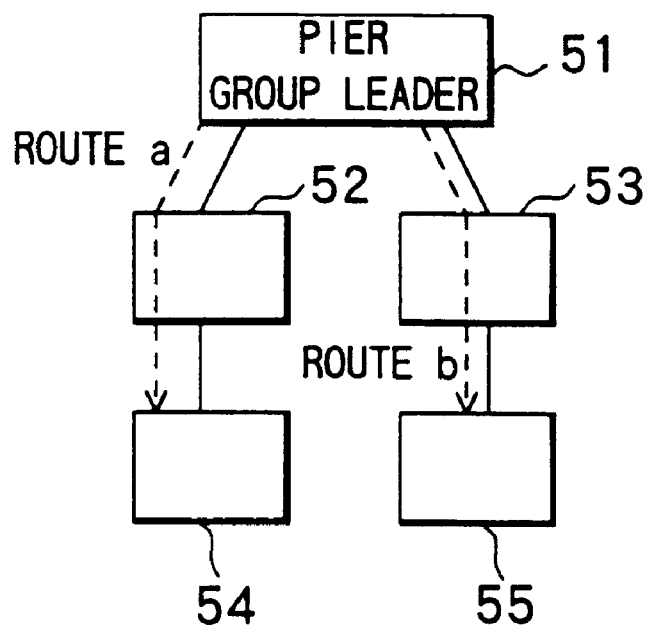
FIG. 11 is a diagram showing a clock supply route determining method of the present invention.
Figure 11:
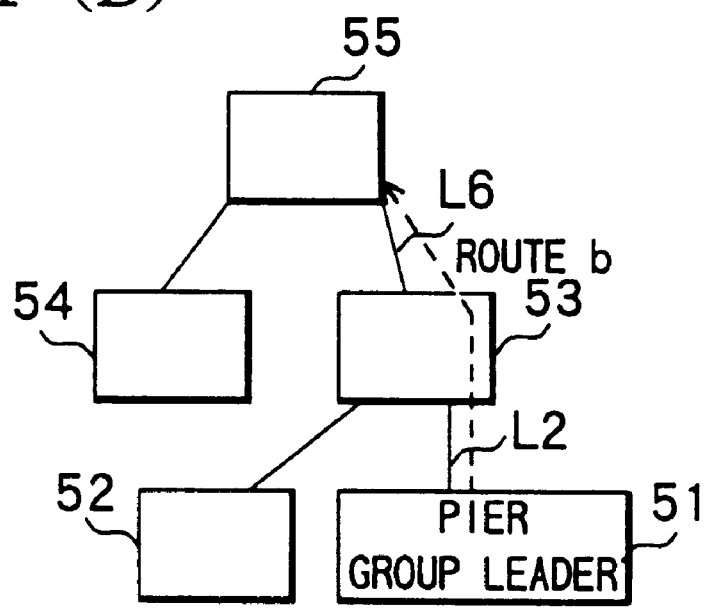

For instance, as a result of the shortest route calculating process operation, the switching unit 55 may have a view shown in FIG. 11(B), and sets a port for storing a path L6 connected with the switching unit 53 as a clock extracting port, while using the switching unit 53 as the clock synchronization source. As described above, in the ATM network according to the embodiment 3, the clock tree is automatically formed while setting the pier group leader as the clock synchronization source, and the clock extracting ports (namely, clock input ports) are set in such a manner that the respective group members can receive the clocks supplied from the pier group leader through the shortest routes.

On the other hand, PNNI recommends the manner for setting any one of the group members as another pier group leader in the case that a failure happens to occur in the present pier group leader. In accordance with this recommendation, in the ATM network of the embodiment 3, when a failure happens to occur in the switching unit 51 functioning as the pier group leader, for instance, the following manner has been set. That is, the switching unit 55 may become the pier group leader, instead of the previous switching unit 51. In other words, when the failure occurs in the switching unit 51, such a message indicating the occurrence of failure is notified to the respective switching units 52 to 55, and the setting process operation in order that the switching unit 55 newly becomes the pier group leader is automatically carried out. Also, other switching units automatically perform the setting process operation in order that the switching unit 55 is handled as the pier group leader.

Figure 12:
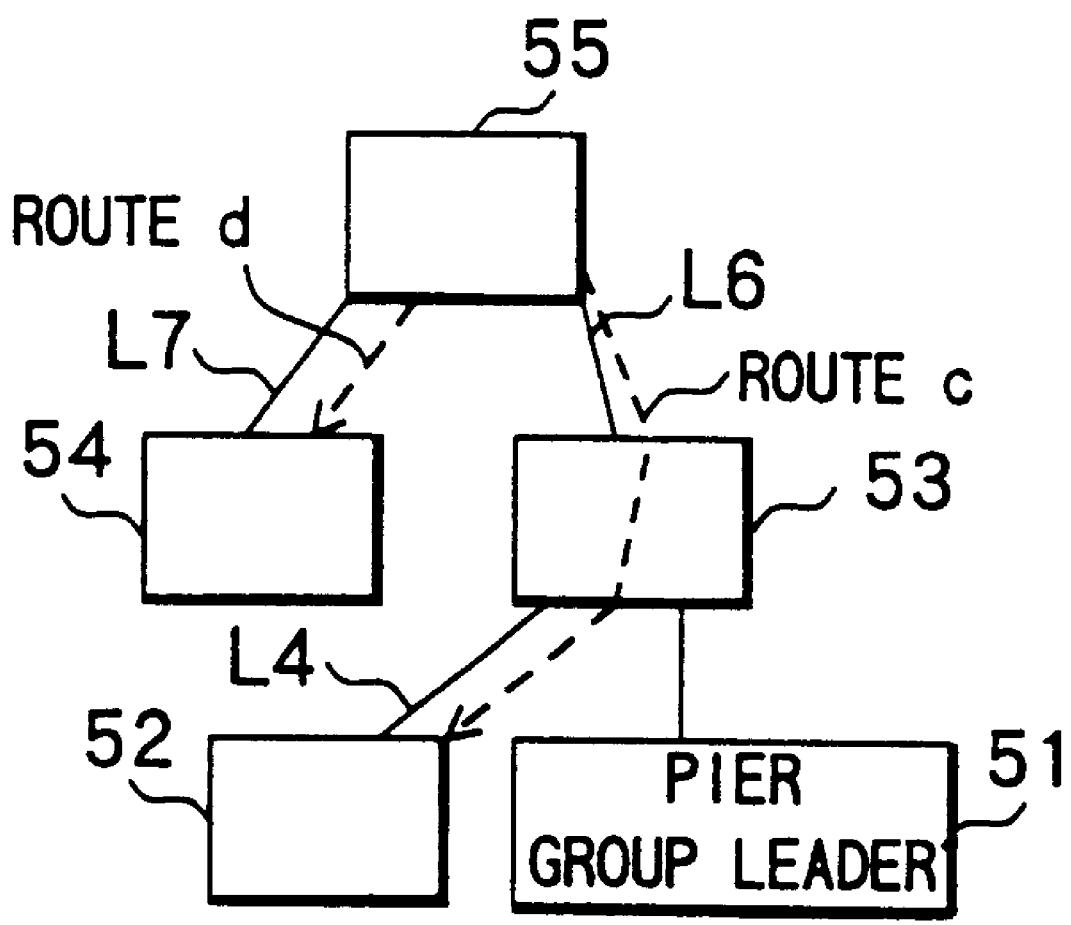
FIG. 12 is a diagram showing a clock supply route determining method of the present invention.
Figure 13:
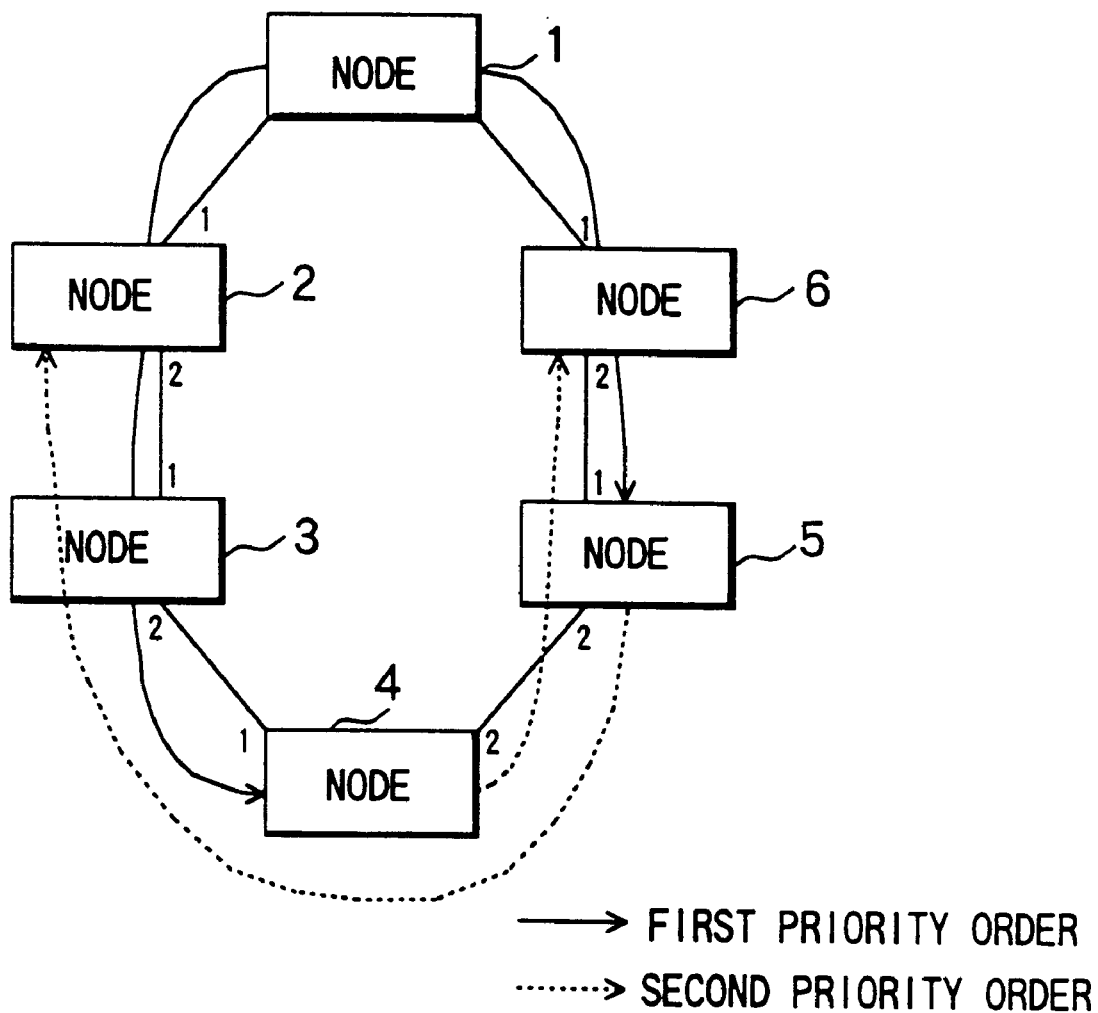
FIG. 13 is an diagram showing the conventional ATM network.

At this time, the switching unit 55 may newly become the clock synchronization source instead of the switching machine 51. As a result, the switching unit 55 sets the shortest routes to other switching machines as the clock supply route by using the result of the shortest route calculating process operation. That is, as shown in FIG. 12, the route defined from the switching unit 55 through the switching unit 53 to the switching unit 52 is set as a clock supply route "c", whereas the route defined from the switching unit 55 to the switching unit 54 is set as a clock supplying route "d".

On the other hand, when the respective switching units 52 to 54 receive such a message that the failure occurs in the switching unit 51, the setting conditions of the ports are changed in such a way that the ports of the shortest routes to the switching unit 55 become the clock extracting ports.

As explained above, in accordance with the ATM network, the clock supply route (namely, clock synchronization topology) within the pier group can be automatically set based upon the results of the shortest route determining process operations executed in the respective switching units 51 to 55 within the pier group.

Also, when a failure happens to occur in the clock synchronization source, another switching unit may become the clock synchronization source, and the clock tree is set while setting this clock synchronization source as the route. Thus, the clock supply route is newly set in accordance with this clock tree. Also, since other switching units automatically change the setting conditions of the clock extracting ports in accordance with this newly set clock supply route, it is possible to avoid such a condition. That is, since the malfunction of the clock synchronization source occurs, other switching units cannot establish the clock synchronization.

It is apparent that, in this invention, a wide range of different working modes can be formed based on the invention without dethroughting from the spirit and scope of the invention. This invention is not restricted by its specific working modes except being limited by the appended claims.

What is claimed is:

1. An ATM network system having a clock synchronization source and a plurality of nodes synchronized with said clock synchronization source, and set a plurality of routes for supplying a clock from said clock synchronization source to each of said nodes, wherein each of said nodes has a connection that is used to confirm whether a route for receiving the clock is normal or not, when one of said nodes detects a failure which occurred in a presently used route,said detecting node gives a failure signal to an other node to be supplied the clock from said detecting node itself through the failure-detected route, via the connection, and changes said failure-detected route under use into an other route, and when received the failure signal from said other node via the connection, changes said failure-detected route into an other route in accordance with the failure signal.

2. An ATM network system as claimed in claim 1, wherein each of said nodes, when changing a route by a receipt of the failure signal, selects a route that the node is not received the clock from the node detecting said failure-detected route among said a plurality of routes.

3. An ATM network system as claimed in claim 1, wherein each of said nodes, when having a different route set between the node and another node to be given the failure signal, the different route in a same direction with said failure-detected route, also sends out the failure signal to a connection corresponding to the different route.

4. An ATM network system as claimed in claim 1, wherein each of said nodes having a plurality of ports inputed a clock which is outputted from any one of said clock synchronization source and other nodes; and wherein each of said nodes changes a route by change of a setting of each of said ports.

5. A clock supply route changing method for an ATM network system having a clock synchronization source and a plurality of nodes synchronized with said clock synchronization source, and set a plurality of routes for supplying a clock from said clock synchronization source to each of said nodes, wherein each of said nodes has a connection that is used to confirm whether a route for receiving the clock is normal or not, when one of said nodes detects a failure which occurred in a presently used route, said detecting node gives a failure signal to an other node receiving the clock from said dectecting node itself through the failure-detected route, via the connection, and changes the failure-detected route under use into an other route, and when received a failure signal via the connection, changes said failure-detected route into an other route in accordance with the failure signal.

6. A clock supply route changing method as claimed in claim 5, wherein each of said nodes, when changing a route by a receipt of said failure signal, selects a route that the node is not received a clock from the node detecting said failure-detected route among said a plurality of routes.

7. An clock supply route changing method as claimed in claim 5, wherein each of said nodes, when having a different route set between the node and an other node to be given the failure signal, the different route in a same direction with said failure-detected route, also transmits said failure signal to a connection corresponding to the different route.

8. A clock supply route determining method in an ATM network system in which said ATM network system is constituted based upon a private network-to-network interface specification; a plurality of nodes are formed as a pier group; any one of the nodes within said pier group is set as a pier group leader; and said pier group leader is set as a clock synchronization source;

wherein each of said nodes acquires data about shortest routes defined from the node to each of other nodes;

said pier group leader determines shortest routes from the pier group leader to each of other nodes as clock supply routes based upon said data about the shortest routes as clock supply routes;

each of the nodes other than said pier group leader determines shortest routes defined from the node up to said pier group leader as clock supply routes based on the data of said shortest routes; and each of the nodes has a connection that is used to confirm whether a clock supply route for receiving the clock is normal or not, when one of said nodes detects a failure which occurred in a presently used clock supply route, said detecting node gives a failure signal to an other node to be supplied the clock from said dectecting node itself through the failure-detected clock supply route, via the connection, and changes said failure-detected clock supply route under use into an other clock supply route, and when received the failure signal from said other node via the connection, changes said failure-detected clock supply route into an other clock supply route in accordance with the failure signal.

9. A clock supply route determining method as claimed in claim 8, wherein:

when said pier group leader has a failure, a newly pier group leader is determined among the nodes other than said pier group leader;

the newly pier group leader determines shortest routes defined from the newly pier group leader to the nodes as lock supply routes based on the data of said shortest routes; and each of said nodes other than the newly pier group leader determines the shortest routes defined from the newly pier group leader to said node as clock supply routes based upon said data of the shortest routes.

* * * * *

UNITED STATES PATENT AND TRADEMARK OFFICE
CERTIFICATE OF CORRECTION

PATENT NO.     : 6,414,959 B1
DATED          : July 2, 2002
INVENTOR(S)    : K. Asano It is certified that error appears in the above-identified patent and that said Letters Patent is hereby corrected as shown below:

Column 14,
Line 3, currently reads "as lock supply routes based on the data of said shortest" please change the same to read -- as clock supply routes based on the data of said shortest --

Signed and Sealed this

Twenty-seventh Day of May, 2003

JAMES E. ROGAN
*Director of the United States Patent and Trademark Office*